US012576768B2

(12) United States Patent
    Shin et al.

(10) Patent No.:    US 12,576,768 B2
(45) Date of Patent:        Mar. 17, 2026

(54) COWL SIDE TRIM

(71) Applicants: Hyundai Motor Company, Seoul
               (KR); Kia Corporation, Seoul (KR)

(72) Inventors: Han Shin, Seoul (KR); Kyu Hee Kim,
              Suwon-si (KR); Kang Ho Joo,
              Suwon-si (KR)

(73) Assignees: Hyundai Motor Company, Seoul
              (KR); Kia Corporation, Seoul (KR)

( * ) Notice:   Subject to any disclaimer, the term of this
              patent is extended or adjusted under 35
              U.S.C. 154(b) by 449 days.

(21) Appl. No.: 18/184,273

(22) Filed:     Mar. 15, 2023

(65)                Prior Publication Data

US 2024/0010115 A1       Jan. 11, 2024

(30)         Foreign Application Priority Data

Jul. 7, 2022     (KR) ........................ 10-2022-0083745

(51) Int. Cl.
     *B60N 3/06*          (2006.01)
     *B60R 21/00*         (2006.01)
     *B60R 21/02*         (2006.01)
(52) U.S. Cl.
     CPC .............. *B60N 3/06* (2013.01); *B60N 3/066*
          (2013.01); *B60R 2021/0006* (2013.01); ***B60R
              2021/0046* (2013.01); *B60R 2021/0213***
                                              (2013.01)

(58) Field of Classification Search
     CPC .. B60N 3/06; B60N 3/066; B60R 2021/0006;
                  B60R 2021/0046; B60R 2021/0213
     See application file for complete search history.

(56)                References Cited

U.S. PATENT DOCUMENTS 8,714,620  B1 *   5/2014   Meszaros ................. B60N 3/06
                                                         296/39.1
     2019/0092260  A1 *  3/2019   Greggs .................. B60N 3/066

FOREIGN PATENT DOCUMENTS

DE       102009042547 A1 *  3/2011   ............. B60N 3/066
     KR     10-2017-0065382       6/2017

* cited by examiner

*Primary Examiner* — Daniel J Colilla
     (74) *Attorney, Agent, or Firm* — Fish & Richardson P.C.

(57)                ABSTRACT

A cowl side trim is configured to be installed on a cowl side
panel on a driver side of a vehicle. The cowl side trim
includes a cowl part installed on the cowl side panel at a
position adjacent to a door of the vehicle, a footrest part
integrally formed with the cowl part, and a breakage forming
part formed along a boundary line dividing a rear surface of
the cowl part and a rear surface of the footrest part.

18 Claims, 7 Drawing Sheets

FIG. 6A            FIG. 6B

COWL SIDE TRIM

CROSS-REFERENCE TO RELATED APPLICATION

This application is based on and claims priority under 35 U.S.C. § 119 to Korean Patent Application No. 10-2022-0083745, filed on Jul. 7, 2022, in the Korean Intellectual Property Office, the disclosure of which is incorporated by reference herein in its entirety.

TECHNICAL FIELD

The disclosure relates to a cowl side trim, and more specifically, to an integral cowl side trim with a footrest.

BACKGROUND

A body of a vehicle is designed and manufactured to have sufficient rigidity in preparation for a frontal collision of the vehicle, whereas relatively, an aspect of protecting occupants from the impact applied in the event of a side collision of the vehicle is still insufficient. Therefore, as the number of damages occurring in the event of a side collision of a vehicle increases and a degree of the damage increases, laws related thereto are being strengthened. In addition, its importance is gradually being recognized due to external laws and regulations on vehicles for export.

A cowl complete of a vehicle serves to suppress vibration that occurs while driving, especially torsion of a body that occurs in the event of a sharp turn, absorb impact energy generated in the event of a vehicle collision, and prevent various components of an engine room from entering an interior of the vehicle by the impact energy.

A cowl side of a vehicle is disposed between a fender apron upper member of a floor complete and a front end of a side outer body, and integrally joined therewith by welding. Because a place where the cowl side is disposed in the vehicle is a part where the rigidity of the body is weak, a reinforcing material is disposed on an inner side of the cowl side.

The reinforcing material of the cowl side can contribute to reducing the cost and weight of the vehicle by minimizing its number, and have a function of transmitting an impact applied in the event of a frontal offset collision of the vehicle to a front pillar side of a side complete and dispersing the impact itself. In addition, in a case where there is a region where welding is impossible when the reinforcing material is disposed, a structural adhesive is conventionally used, in this case, because a cycle time becomes longer, it is necessary to avoid the occurrence of a region where welding is impossible when the reinforcing material is disposed.

SUMMARY

It is an aspect of the disclosure to provide a cowl side trim in which a footrest is integrally connected.

It is another aspect of the disclosure to provide a cowl side trim having a structure in which a cowl part and a footrest part can be easily broken.

Additional aspects of the disclosure will be set forth in part in the description which follows and, in part, will be obvious from the description, or can be learned by practice of the disclosure.

In accordance with an aspect of the disclosure, a cowl side trim, which is installed on a cowl side panel on a driver side of a vehicle, includes a cowl part installed on the cowl side panel at a position adjacent to a door of the vehicle, a footrest part integrally formed with the cowl part, and a breakage forming part formed along a boundary line dividing a rear surface of the cowl part and a rear surface of the footrest part.

The footrest part can be separated from the cowl part along the boundary line when the cowl part or the footrest part receives an impact.

The breakage forming part can include a plurality of first ribs provided on the rear surface of the cowl part to be formed along the cowl part from the boundary line, and a plurality of second ribs provided on the rear surface of the footrest part to be formed along the footrest part from the boundary line.

The breakage forming part can further include notch grooves provided between the first ribs and the second ribs to be formed along the boundary line.

The first rib can have a shape in which a height thereof is lowered as a distance from the boundary line increases.

The notch groove can act as a breakage region when the cowl part or the footrest part receives an impact.

A coupling part for coupling with the cowl side panel can be formed on the rear surface of the footrest part.

Cross sections of the cowl part and the footrest part can have an 'I' shape with respect to the boundary line.

The second rib can include a notch forming portion extending in a direction perpendicular to the cowl part, and a rib extension portion having a lower height than the notch forming portion.

When an impact is applied to the notch forming portion, a force rotating about the cowl part with respect to the boundary line can act on the footrest part.

A height of the notch forming portion can be greater than a height of the first rib.

The breakage forming part can further include a breakage inducing portion formed to extend in parallel with the boundary line to connect the plurality of second ribs.

In accordance with an aspect of the disclosure, a cowl side trim, which is installed on a cowl side panel on a driver side of a vehicle, includes a cowl part formed to extend to one side with respect to a boundary line, a footrest part formed to extend to the other side with respect to the boundary line, and a breakage forming part provided to enable separation of the cowl part and the footrest part and formed over a portion of a rear surface of the cowl part and a portion of a rear surface of the footrest part.

The breakage forming part can include a plurality of first ribs formed to protrude from the rear surface of the cowl part, a plurality of second ribs formed to protrude from the rear surface of the footrest part, and a breakage inducing portion formed to connect the plurality of second ribs.

Notch grooves formed in a 'V' shape along the boundary line can be provided between the first ribs and the second ribs.

The second rib can include a notch forming portion positioned adjacent to the boundary line and having a 'U' shape, and a rib extension portion having a bar shape and formed on a rear side of the notch forming portion.

The breakage inducing portion can extend in a direction perpendicular to a direction in which the plurality of second ribs extends.

The first rib can be formed to extend to one side in a direction perpendicular to the boundary line.

The second rib can be formed to extend to the other side in a direction perpendicular to the boundary line.

When a predetermined external force is applied to the breakage inducing portion, the notch groove can be provided to generate a crack.

DETAILED DESCRIPTION

Hereinafter, one or more implementations of the disclosure will be described in detail with reference to the accompanying drawings. The implementations described below are provided by way of example so that those skilled in the art will be able to fully understand the spirit of the disclosure, and the disclosure is not limited to the implementations described below, and can be implemented in other forms. In order to clearly explain the disclosure, parts not related to the description are omitted from the drawings, and the size of the components can be exaggerated for convenience.

Figure 1:
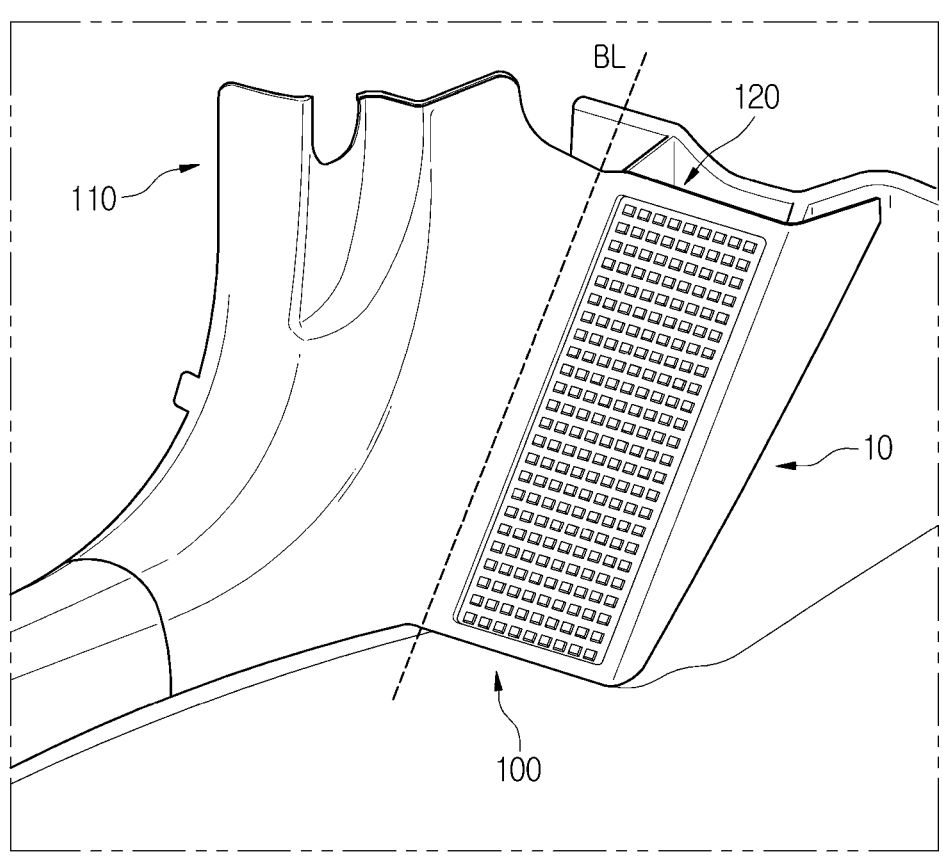
FIG. 1 is a perspective view illustrating an example of a cowl side trim installed on a cowl side panel.
Figure 2:
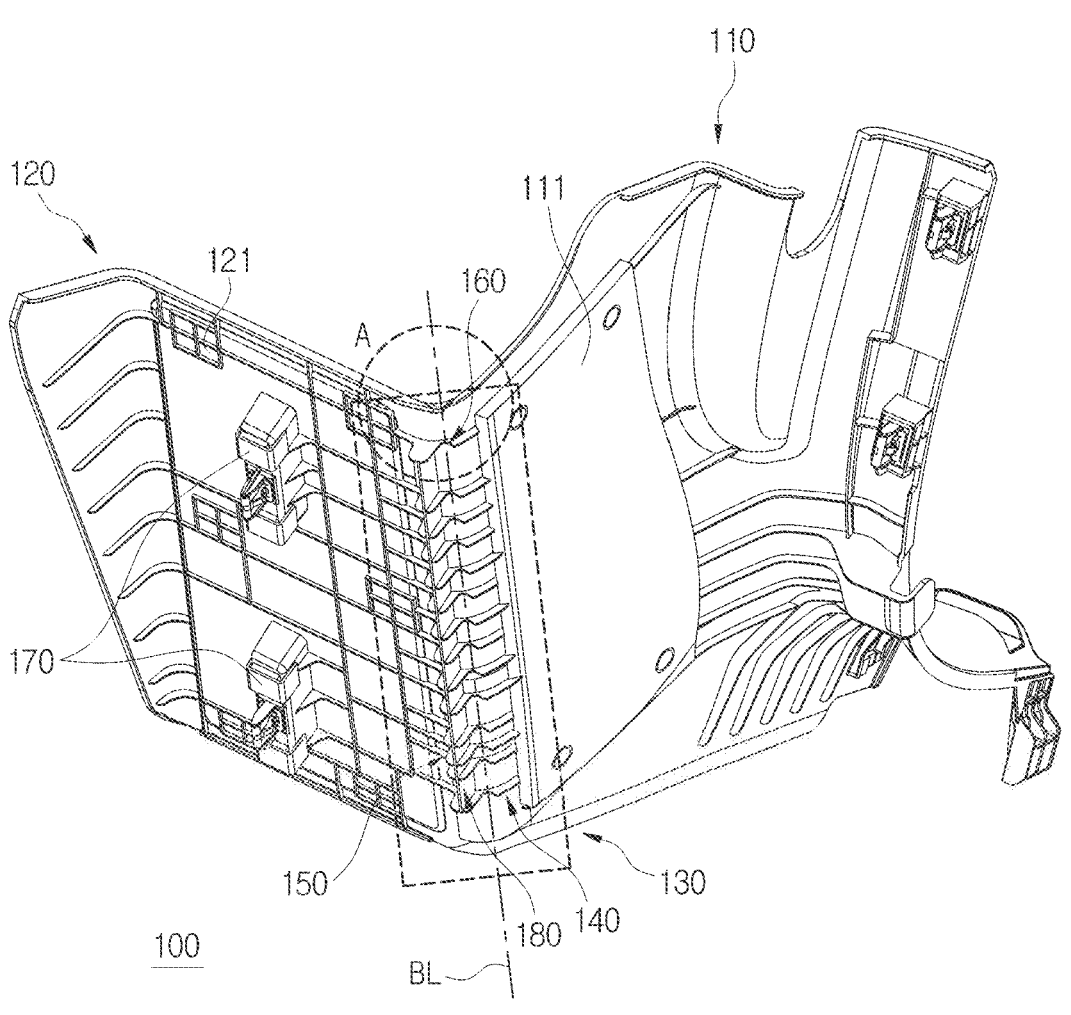
FIG. 2 is a rear perspective view of the cowl side trim illustrated in FIG. 1.
Figure 3:
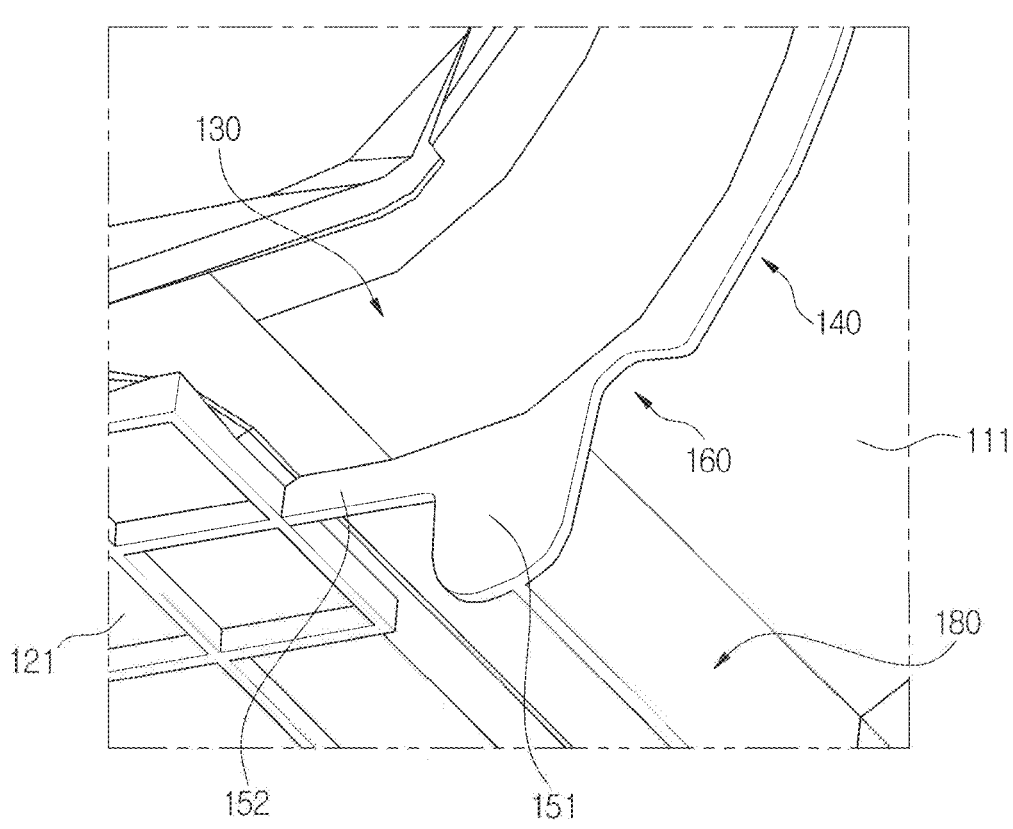
FIG. 3 is an enlarged view of part A of the cowl side trim illustrated in FIG. 2.

FIG. 1 is a perspective view illustrating a state in which a cowl side trim is installed on a cowl side panel, FIG. 2 is a rear perspective view of the cowl side trim illustrated in FIG. 1, and FIG. 3 is an enlarged view of part A of the cowl side trim illustrated in FIG. 2.

Referring to FIG. 1, in some implementations, a cowl side trim 100 can be installed on a driver side cowl side panel 10 of a vehicle. The cowl side trim 100 can include a cowl part 110 installed at a position adjacent to a door of the vehicle on the cowl side panel 10, and a footrest part 120 integrally formed with the cowl part 110. The cowl part 110 can be formed to extend to one side with respect to a boundary line BL, and the footrest part 120 can be formed to extend to the other side with respect to the boundary line BL.

In some implementations, the cowl side trim 100 can be formed in an integral shape to be manufactured as one part. In some cases, where the cowl side trim is manufactured such that the cowl part and the footrest part are separately made and coupled to a required region, the manufacturing cost may be high. In some implementations according to this application, where the cowl part and the footrest part are integrally manufactured, a manufacturing cost and assembling cost thereof can be reduced, so that a manufacturing cost of the cowl side trim can be reduced.

Referring to FIGS. 2 and 3, the cowl side trim 100 can include a breakage forming part 130 formed along the boundary line BL dividing a rear surface 111 of the cowl part 110 and a rear surface 121 of the footrest part 120. The breakage forming part 130 can enable separation of the cowl part 110 and the footrest part 120. The breakage forming part 130 is not visible from a front side of the cowl side trim 100, and a structure thereof can be confirmed through a rear side of the cowl side trim 100.

The breakage forming part 130 can include a plurality of first ribs 140 protruding from the rear surface 111 of the cowl part 110 to be formed along the cowl part 110 from the boundary line BL, and a plurality of second ribs 150 protruding from the rear surface 121 of the footrest part 120 to be formed along the footrest part 120 from the boundary line BL. The first rib 140 can have a shape in which a height thereof is lowered as a distance from the boundary line BL increases. The first rib 140 can be formed along the rear surface 111 of the cowl part 110. The first rib 140 can be formed to extend to one side in a direction perpendicular to the boundary line BL, and the second rib 150 can be formed to extend to the other side in the direction perpendicular to the boundary line BL.

The breakage forming part 130 can further include a notch groove 160 formed between the first rib 140 and the second rib 150. The notch groove 160 can have a shape of extending along the boundary line BL, and can have a V shape. The notch groove 160 can act as a region that is broken when the cowl part 110 or the footrest part 120 receives an impact. A portion corresponding to the notch groove 160 in the cowl side trim 100 can have a smaller thickness than the first rib 140 and the second rib 150 around thereof.

A coupling part 170 for coupling with the cowl side panel 10 can be formed on the rear surface 121 of the footrest part 120. A plurality of the coupling parts 170 can be provided for sturdy coupling with the cowl side panel 10. By such a structure, coupling between the cowl side trim 100 and the cowl side panel 10 can be strengthened, and a detailed description thereof will be given later.

Cross sections of the cowl part 110 and the footrest part 120 can have an 'L' shape with respect to the boundary line BL. In a state in which the cowl side trim 100 is installed on the cowl side panel 10, the cowl part 110 can be positioned to face the door of the vehicle, and the footrest part 120 can be positioned to face a driver.

The structure of the breakage forming part 130 will be described in more detail with reference to FIG. 3. The notch groove 160 can act as a fragile region that is easily damaged when an impact is applied to the cowl side trim 100. The second rib 150 can include a notch forming portion 151 extending in a direction perpendicular to the cowl part 110, and a rib extension portion 152 having a lower height than the notch forming portion 151. When viewed from the front, the notch groove 160, the first rib 140, and the notch forming portion 151 can be formed in an 'A' shape.

An end of the notch forming portion 151 can be formed in a semicircular shape. The notch forming portion 151 can be positioned adjacent to the boundary line BL and can have a 'U' shape. The rib extension portion 152 can have a bar shape and be formed on a rear side of the notch forming portion 151.

The notch forming portion 151 can have a height greater than that of the first rib 140. The notch forming portion 151 can have a shape more protruding downward than the first rib 140 and the rib extension portion 152. When an impact is applied to the notch forming portion 151, a force rotating about the cowl part 110 with respect to the boundary line BL can act on the footrest part 120.

Referring to FIGS. 2 and 3, the breakage forming part 130 can include a breakage inducing portion 180 formed to extend in parallel with the boundary line BL to connect the plurality of second ribs 150. The breakage inducing portion 180 can have a bar shape of connecting a start and an end of a plurality of the notch forming portions 151 as a whole. The breakage inducing portion 180 can extend in a direction perpendicular to a direction in which the plurality of second ribs 150 extends.

The breakage inducing portion 180 can serve as a lever for separating the footrest part 120 from the cowl part 110. That is, the breakage inducing portion 180 can be configured to generate a crack in the notch grooves 160 when a predetermined external force is applied thereto.

Figure 4:
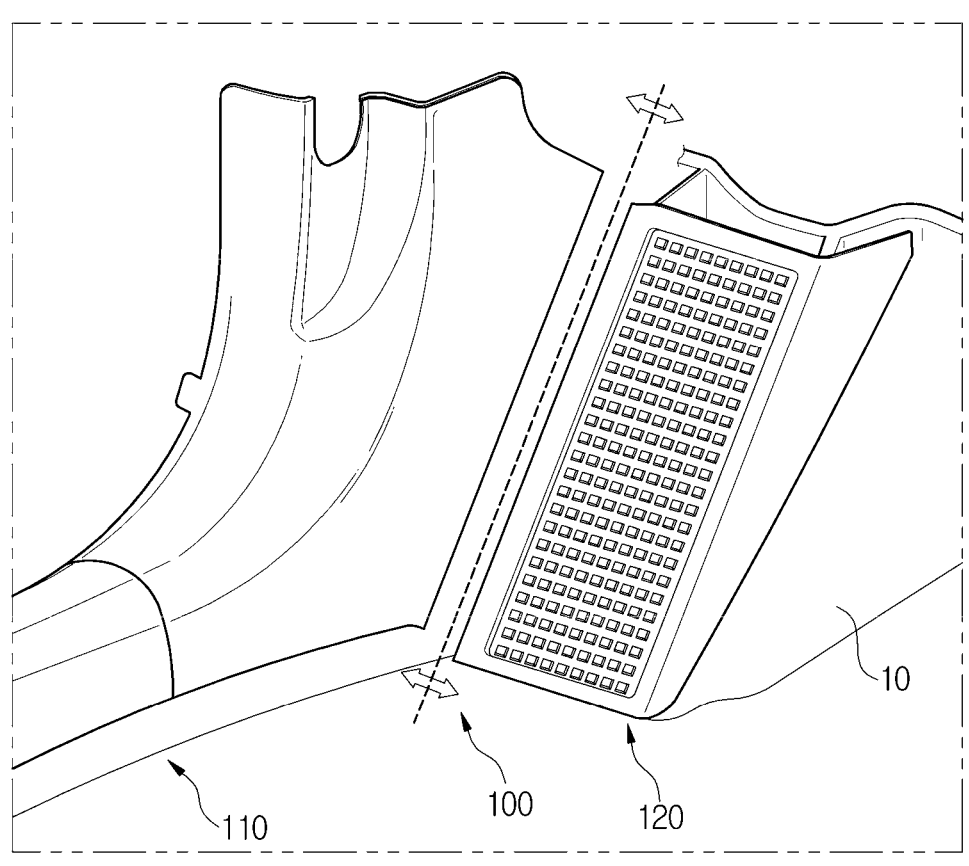
FIG. 4 is a view illustrating a state in which the cowl side trim illustrated in FIG. 1 is separated by an impact.
Figure 5:
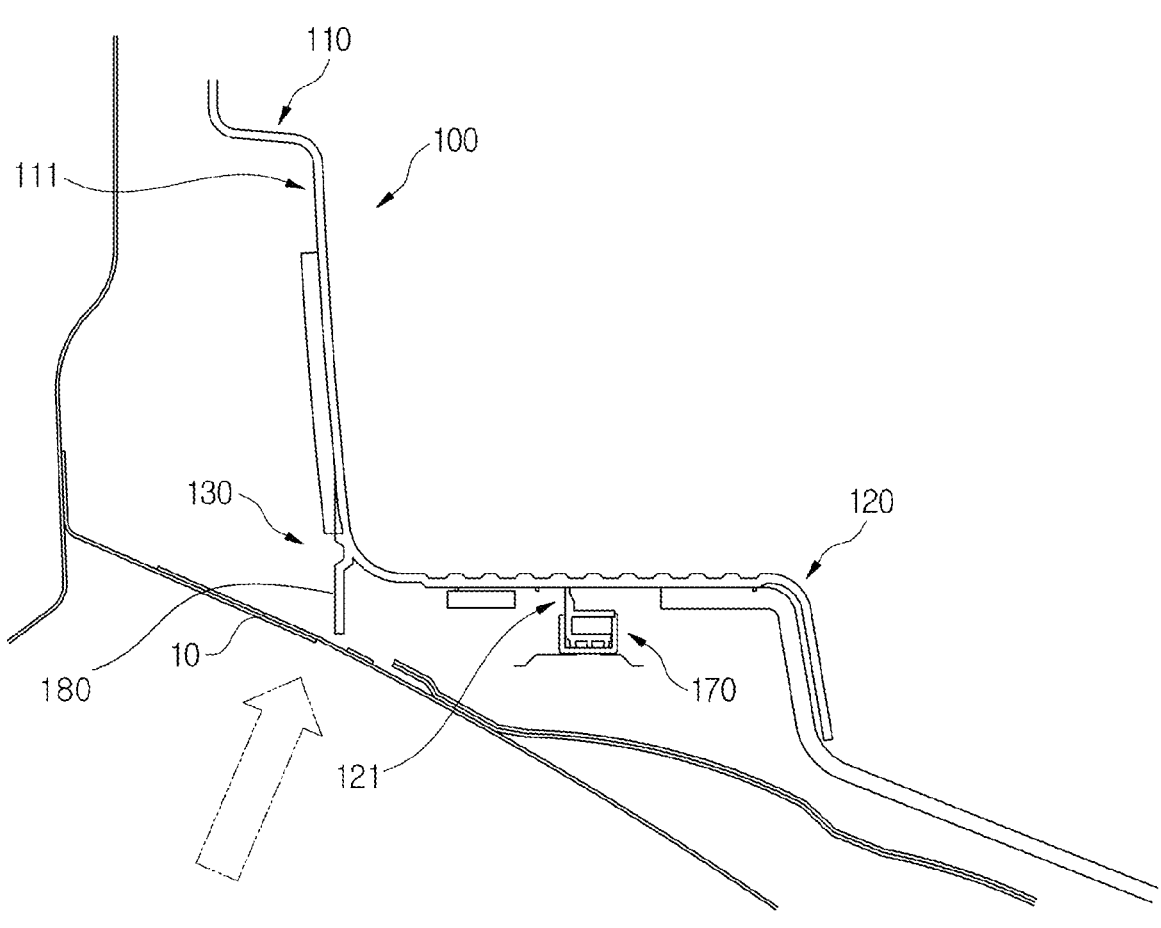
FIG. 5 is a view showing an example of a breakage inducing structure of the cowl side trim.
Figure 6:
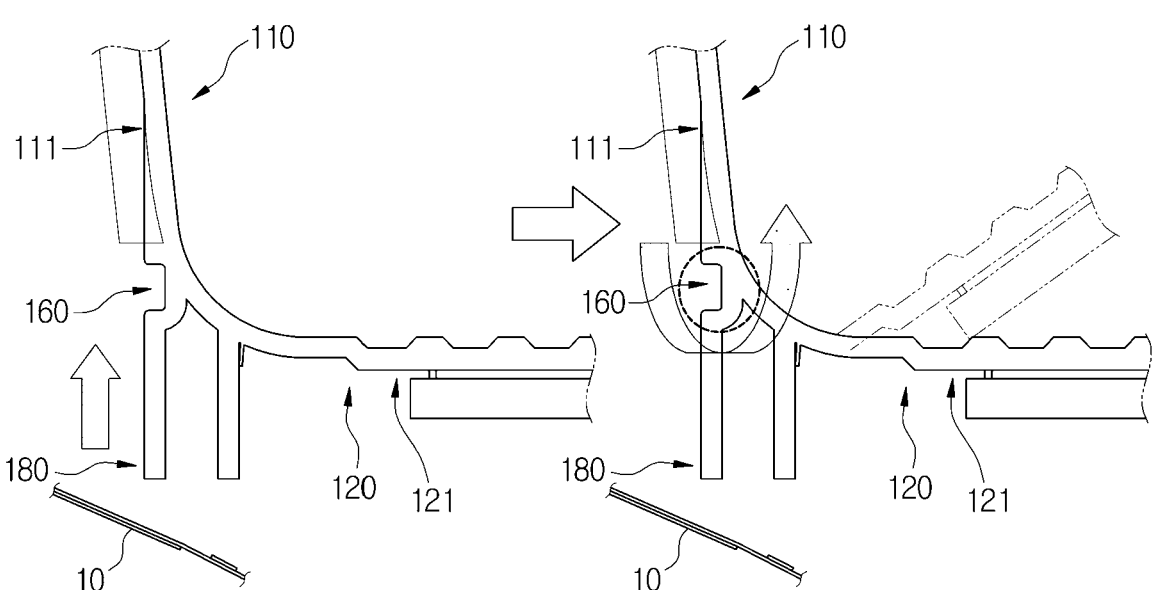
FIGS. 6A and 6B are exemplary views showing the breakage inducing structure of the cowl side trim.

FIG. 4 is a view illustrating a state in which the cowl side trim illustrated in FIG. 1 is separated by an impact, FIG. 5 is a view for explaining a breakage inducing structure of the cowl side trim, and FIGS. 6A-B illustrate the breakage inducing structure of the cowl side trim.

Referring to FIG. 4, in a case where breakage is not easily induced around the boundary line BL in the event of a frontal collision of the vehicle, as a footrest bracket is deformed without absorbing an impact, the footrest part is deformed so that a load is directly applied to the driver, and as a result, there is a possibility of causing injury to ankle of the driver. In some implementations, because the footrest part 120 is separated from the cowl part 110 as the notch groove 160 acts as a weak region in the event of a front collision of the vehicle, the possibility of injury to the ankle of the driver can be minimized by absorbing the impact caused by the collision of the vehicle.

The footrest part 120 can be separated from the cowl part 110 along the boundary line BL when the cowl part 110 or the footrest part 120 of the cowl side trim 100 receives an impact. Because the notch groove 160 has a concave shape between the rib extension portion 152 and the first rib 140, the notch groove 160 is vulnerable to breakage when torque is applied to the cowl part 110 or the footrest part 120. Referring to FIGS. 5 and 6A, when an impact is applied to the cowl side panel 10, it can be confirmed that first, an impact is applied to the breakage inducing portion 180. Referring to FIG. 6B, deformation of the footrest part 120 can be induced by a breakage inducing structure. The breakage inducing portion 180 can apply a torque to the footrest part 120, and the footrest part 120 can be rotated with respect to the cowl part 110. At this time, as the notch grooves 160 formed along the boundary line BL are broken, the footrest part 120 and the cowl part 110 are separated.

Figure 7:
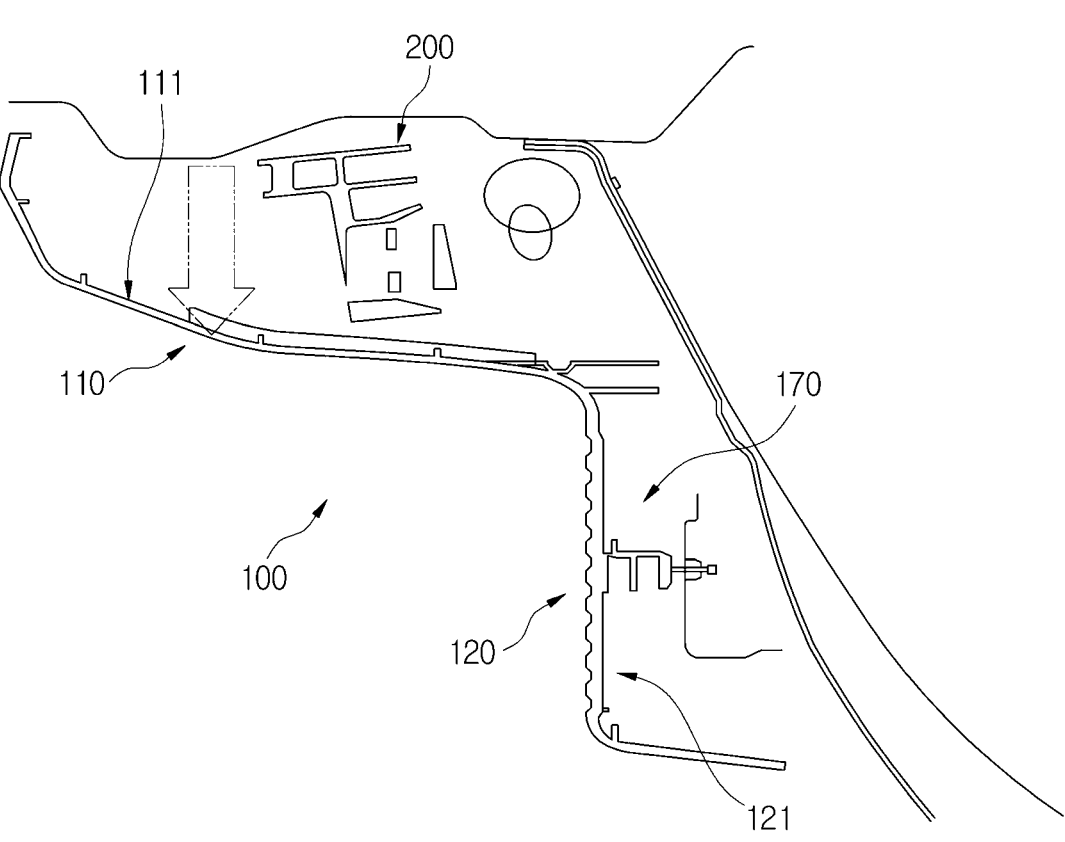
FIG. 7 is a view for explaining a supporting force of the cowl side trim.

FIG. 7 is a view for explaining a supporting force of the cowl side trim.

Conventionally, a coupling part for coupling the cowl site trim and the cowl side panel is formed on a rear side of the cowl part. In this case, a direction in which a wiring pushes is opposite to a direction in which the cowl side trim is mounted, so that when the cowl side trim is mounted to the cowl side panel, a load can be applied to components. In this case, although it corresponds to problems of past vehicles by the type of vehicle, there is a possibility that problems of trim assembly and separation can occur multiple times. In addition, when a soft pad (between soft pads) is applied to a supporting space between the cowl side panel and the footrest part as in a conventional method, there is a possibility that a problem of jiggle can occur multiple times depending on the layout of the type of vehicle.

In some implementations, a method of being directly mounted on the cowl side panel 10 by the coupling part 170 formed on the footrest part 120 can be applied. That is, in some implementations, when a vehicle collides, a mounting direction that intersects a reaction force generation direction of an internal component (the wiring, etc.) can be applied.

In some implementations, a supporting force can be strengthened by directly using the supporting space as a mounting space. As a mounting region (the coupling part

170) is formed in the supporting space, the direction in which the wiring pushes and a mounting direction of the cowl side trim 100 can intersect, and as a region where the wiring is disposed and the coupling part 170 are spaced apart from each other, the generation of a load during assembly can be minimized.

Accordingly, because the direction in which the wiring pushes the cowl side trim 100 and a direction in which the coupling part 170 is mounted are substantially perpendicular, the rigidity can be strengthened compared to the conventional method.

In addition, the assembly direction can be simplified, so that the assembly work can be improved.

As is apparent from the above, a cowl side trim can reduce a cost as a cowl part and a footrest part are integrally formed.

In addition, the cowl side trim can protect a foot of a driver when a vehicle collision occurs as a notch for inducing breakage is formed on a rear surface thereof.

The implementations disclosed with reference to the accompanying drawings have been described above. However, it will be understood by those skilled in the art that various changes in form and details can be made therein without departing from the spirit and scope of the disclosure as defined by the appended claims.

What is claimed is:

1. A cowl side trim configured to be installed on a cowl side panel of a vehicle, the cowl side trim comprising:
   a cowl part configured to be installed on the cowl side panel and disposed adjacent to a door of the vehicle;
   a footrest part connected to the cowl part; and
   a breakage forming part disposed along a boundary line between a rear surface of the cowl part and a rear surface of the footrest part,
   wherein the breakage forming part comprises:
      a plurality of first ribs that are disposed at the rear surface of the cowl part and extend from the boundary line along the cowl part, and
      a plurality of second ribs that are disposed at the rear surface of the footrest part and extend from the boundary line along the footrest part.

2. The cowl side trim according to claim 1, wherein the footrest part is configured to be separated from the cowl part along the boundary line based on an impact being applied to the cowl part or the footrest part.

3. The cowl side trim according to claim 1, wherein the breakage forming part defines a notch groove arranged along the boundary line, the notch groove being defined between one of the plurality of first ribs and a corresponding one of the plurality of second ribs.

4. The cowl side trim according to claim 1, wherein a height of a first rib of the plurality of first ribs from the rear surface of the cowl part decreases as the first rib extends away from the boundary line.

5. The cowl side trim according to claim 3, wherein the notch groove is configured to define a breakage region based on an impact being applied to the cowl part or the footrest part.

6. The cowl side trim according to claim 1, wherein the footrest part comprises a coupling part disposed at the rear surface of the footrest part and configured to couple to the cowl side panel of the vehicle.

7. The cowl side trim according to claim 1, wherein the cowl part and the footrest part define an L shape that is curved about the boundary line.

8. The cowl side trim according to claim 1, wherein each of the plurality of second ribs comprises:

a notch forming portion that extends perpendicular to the rear surface of the cowl part and defines a first height from the rear surface of the cowl part; and a rib extension portion that defines a second height from the rear surface of the cowl part less than the first height of the notch forming portion.

9. The cowl side trim according to claim 8, wherein the notch forming portion is configured to, based on an impact being applied to the notch forming portion, cause the footrest part to receive a force rotating relative to the cowl part about the boundary line.

10. The cowl side trim according to claim 8, wherein the first height of the notch forming portion is greater than a height of each of the plurality of first ribs from the rear surface of the cowl part.

11. The cowl side trim according to claim 8, wherein the breakage forming part further comprises a breakage inducing portion that extends parallel to the boundary line and connects the plurality of second ribs to one another.

12. A cowl side trim configured to be installed on a cowl side panel of a vehicle, the cowl side comprising:

a cowl part that extends to a first side of a boundary line;

a footrest part that extends to a second side of the boundary line; and a breakage forming part configured to enable separation of the cowl part and the footrest part, the breakage forming part being disposed at a portion of a rear surface of the cowl part and a portion of a rear surface of the footrest part, wherein the breakage forming part comprises:

a plurality of first ribs that protrude from the rear surface of the cowl part, a plurality of second ribs that protrude from the rear surface of the footrest part, and a breakage inducing portion that connect the plurality of second ribs to one another.

13. The cowl side trim according to claim 12, wherein the breakage forming part defines a notch groove arranged along the boundary line, the notch groove having a V shape and being defined between one of the plurality of first ribs and a corresponding one of the plurality of second ribs.

14. The cowl side trim according to claim 12, wherein each of the plurality of second ribs comprises:

a notch forming portion that has a U shape; and a rib extension portion that has a bar shape and is disposed at a side of the notch forming portion, the notch forming portion being located closer to the boundary line than the rib extension portion.

15. The cowl side trim according to claim 12, wherein the breakage inducing portion extends perpendicular to the plurality of second ribs.

16. The cowl side trim according to claim 12, wherein each of the plurality of first ribs extends to the first side in a direction perpendicular to the boundary line.

17. The cowl side trim according to claim 12, wherein each of the plurality of second ribs extends to the second side in a direction perpendicular to the boundary line.

18. The cowl side trim according to claim 13, wherein the notch groove is configured to, based on an impact applied to the breakage inducing portion exceeding a predetermined force, generate a crack in the breakage forming part.

* * * * *